United States Patent [19]

Krause

[11] 4,238,969

[45] Dec. 16, 1980

[54] MECHANICAL GEARING FOR ROLLER BLINDS AND AWNINGS

[75] Inventor: Bruno Krause, Heiligenhaus, Fed. Rep. of Germany

[73] Assignee: Klafft & Klüppelholz, Heiligenhaus, Fed. Rep. of Germany

[21] Appl. No.: 962,085

[22] Filed: Nov. 20, 1978

[30] Foreign Application Priority Data

May 26, 1978 [DE] Fed. Rep. of Germany ....... 2823134

[51] Int. Cl.³ .......................... F16H 57/10; F16H 1/16

[52] U.S. Cl. ...................................... 74/411.5; 74/425

[58] Field of Search ................ 160/133; 74/411.5, 425

[56] References Cited

U.S. PATENT DOCUMENTS 3,813,958 6/1974 Meyer ................................ 74/411.5

4,055,092 10/1977 Aberg ............................... 74/425 X

*Primary Examiner*—C. J. Husar

*Assistant Examiner*—Conrad Berman

*Attorney, Agent, or Firm*—Martin A. Farber

[57] ABSTRACT

A transmission or mechanical gearing for roller blinds or gates, window shades and awnings or the like, with a self-locking worm gear drive in a two part housing on one end of a shaft and an abutment for limiting of the number of rotations of the shaft in the unwinding direction. The abutment comprises an abutment pinion with the teeth number (n), the abutment pinion meshing with the worm wheel, a locking disc with the tooth number (n-1), the locking disc likewise meshing with the worm wheel, the locking disc being mounted coaxial to the abutment pinion, and an axially moveable abutment pin arranged in the abutment pinion, the abutment pin being prestressed with a spring and by means of a slot in the locking disc is able to engage in a double-sided abutment in the housing.

6 Claims, 8 Drawing Figures

MECHANICAL GEARING FOR ROLLER BLINDS AND AWNINGS

The invention relates to a transmission or mechanical gearing for roller blinds or gates, window shades and awnings or the like, with a self-locking worm gear drive in a two part housing on one end of a shaft and an abutment for limiting of the number of rotations of the shaft in the unwinding direction.

Roller blinds actuated by a rope or belt run downwardly by their own weight and can only be pulled up again in the opposite rotational sense. To the contrary, mechanical gearings with a self-locking worm gear drive, which are actuated by means of a crank, can be cranked further in both directions of rotation even with an already closed roller blind. Consequently, particularly with changing operating personnel, the danger exists that a closed roller blind or the awning may be cranked up in the wrong direction, and in this manner destruction of the roller blinds or the awnings occur. In order to avoid such servicing or operating errors on mechanical gearings with a self-locking worm wheel drive, it is known to provide an abutment for limitation of the number of rotations of the shaft in the unwinding direction. These known abutments or stops can be connected with the worm wheel drive and can be accommodated in the same housing or also in a separate housing on the other end of the shaft for the roller blinds or the awnings. The accommodation of the abutment in the same housing as the worm wheel drive, heretofore, has had the disadvantage that for the constructive formation of the abutment, normally, only very small space is available, and consequently the construction parts of the abutment were dimensioned poorly or weakly. Connected with this is the danger that the abutment only served as a memory aid and could be easily overwound. The accommodation of the abutment in a separate housing at the other end of the shaft for the roller blinds or the awnings has the disadvantage that two housings are required which are separated from one another, the position of which in the casings for the roller blinds or the awnings must be adjusted or corrected with respect to one another.

It is an object of the present invention therefore to make a mechanical gearing for roller blinds or awnings with a self-locking worm wheel drive, whose abutment for limitation of the number of rotations of a shaft in the unwinding direction is accommodated in the same housing as the worm wheel drive and simultaneously, is constructed so stably that no longer can it be overwound.

It is another object of the present invention to provide a mechanical gearing of the introductory-mentioned type wherein the abutment comprises an abutment pinion (e.g., 9) with the teeth number (e.g., n), the abutment pinion meshing with the worm wheel (3), a locking disc (10) with the tooth number (e.g., n-1), the locking disc likewise meshing with the worm wheel (3), the locking disc (10) being mounted coaxial to the abutment pinion (9), and an axially moveable abutment pin (16) arranged in the abutment pinion (9), the abutment pin being prestressed with a spring (17) and by means of a slot (13) in the locking disc (10) is able to engage in a double-sided abutment (18) in the housing (1).

With a preferred embodiment of the invention, the ends of the slot (13) and the inlet and outlet ends (20*a*), respectively (which lie at the beginning and end, respectively, of the inclined surfaces) of the two abutments (18*b*) of the abutment (18) can be inclined, so that shortly before the roller blind or gate or the awning reaches its end position, without noise, the abutment pin (16) can slide into a recess in front of the abutment, and upon the cranking up of the roller blind or of the awning, respectively, the abutment pin also can again slide out up to the surface of the locking disc.

Furthermore, the axle (11) for the abutment pinion (9) and the locking disc (10) can be formed in one-piece with the abutment (18) and can be secured with the abutment in one-half (1*b*) of the housing (1).

With a mechanical gearing or transmission formed in accordance with the present invention, the abutment pinion (9) with the abutment pin (16) which is accommodated therein and the locking disc (10) with the slot (13) provided therein shift with respect to one another as a result of their relatively different numbers, so that the abutment pin slides through the slot in the locking disc after a certain number of rotations and arrives in front of the abutment in the housing. This constructive formation of the mechanical transmission and of the abutment has the advantage that the abutment in one half of the housing can be constructed so massively that it is not overwound ever with an erroneous servicing or handling. The weakest member in the abutment, namely the abutment pin which is arranged axially displaceable in a blind hole of the abutment pinion, can be made of steel and can be hardened so that it withstands all shearing stresses which occur with an erroneous handling of the roller blind or of the awnings, respectively.

With these and other objects and advantages in view, the present invention will become more clearly understood in connection with the detailed description of a preferred embodiment, when considered with the accompanying drawings, of which:

Figure 1:
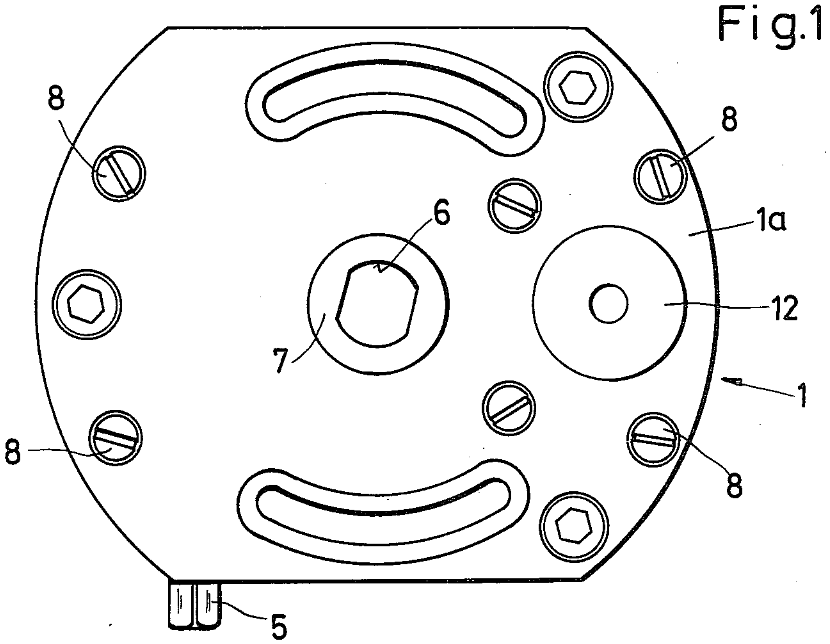
FIG. 1 is a plan view of a closed housing formed in two parts for a mechanical gear in accordance with the present invention.
Figure 2:
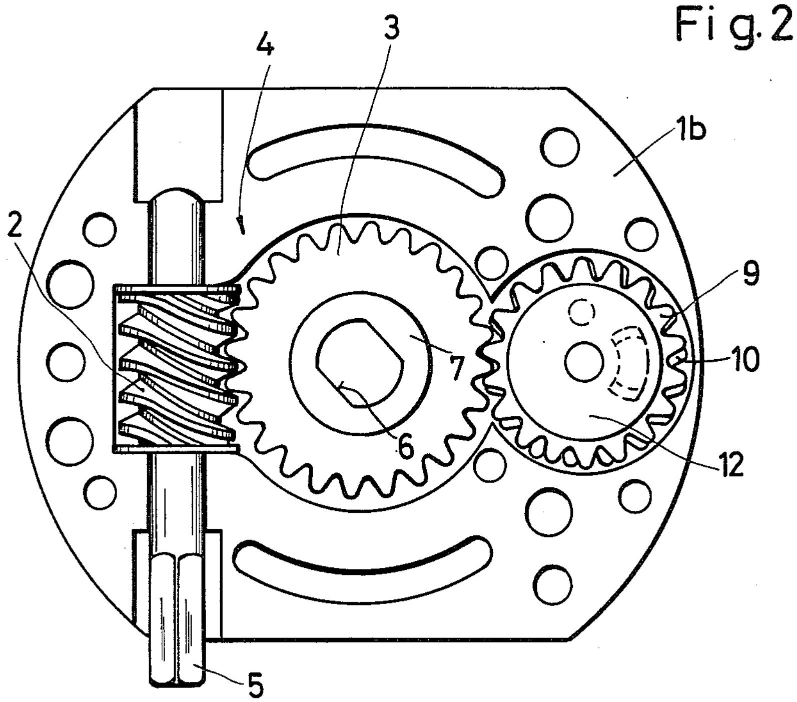
FIG. 2 is a plan view of the same housing after removal of one half of the housing for illustration of the individual parts of the drive.
Figure 4:
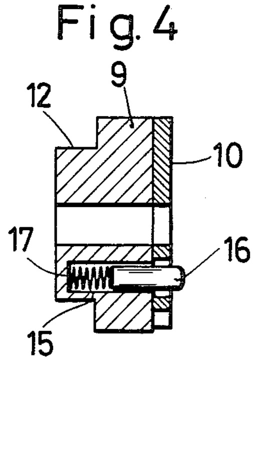
FIG. 4 is a cross-sectional view of the abutment pinion and the locking disc.
Figure 5:
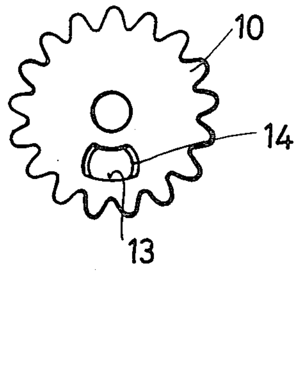
FIG. 5 is a plan view of the locking disc.

Referring now to the drawings, in a housing made of synthetic material or plastic, comprising two halves 1*a*, 1*b*, there is arranged a mechanical gearing or transmission 4. The mechanical gearing 4 comprises a worm 2 and a worm wheel 3. By means of a drive shaft 5, the mechanical gearing acts on a shaft (not illustrated) for the roller blind or the awning, the latter shaft engaging with a bearing pin in a bore 6 of the worm wheel 3. The worm 2 is non-rotatably arranged on the drive shaft 5 and with the drive shaft 5 is mounted in the housing 1. The worm wheel 3 is provided with bearing pins 7 formed or attached thereon on both sides. The worm wheel 3 likewise is mounted in the housing 1 with the bearing pins 7. The two halves 1*a*, 1*b* of the housing 1 are held together with screws 8.

The worm wheel 3 intermeshes engagingly with both an abutment pinion 9 and a locking disc 10, the latter lying coaxially under the pinion 9. Both the pinion and the disc are mounted on an axle 11 which is secured in the housing half 1*b*. With a bearing pin 12 the abutment pinion 9 engages in a bore of the housing half 1*a*.

The abutment pinion 9 has a number of teeth n, whereas the locking disc 10 has a number of teeth n-1, so that in the course of one revolution, a relative displacement or shifting occurs by the width of one tooth. In this manner a slot 13, which is formed in the locking disc 10, with inclined surfaces 14 which are formed on the ends of the slot, is shifted under an abutment pin 16, the latter being disposed axially displaceably in a blind hole 15 formed in the abutment pinion 9. The abutment pin 16 is prestressed or biased outwardly by a compression spring 17, so that the pin 16 is shifted or pushed out from the slot 13 in the locking disc 10.

Figure 3:
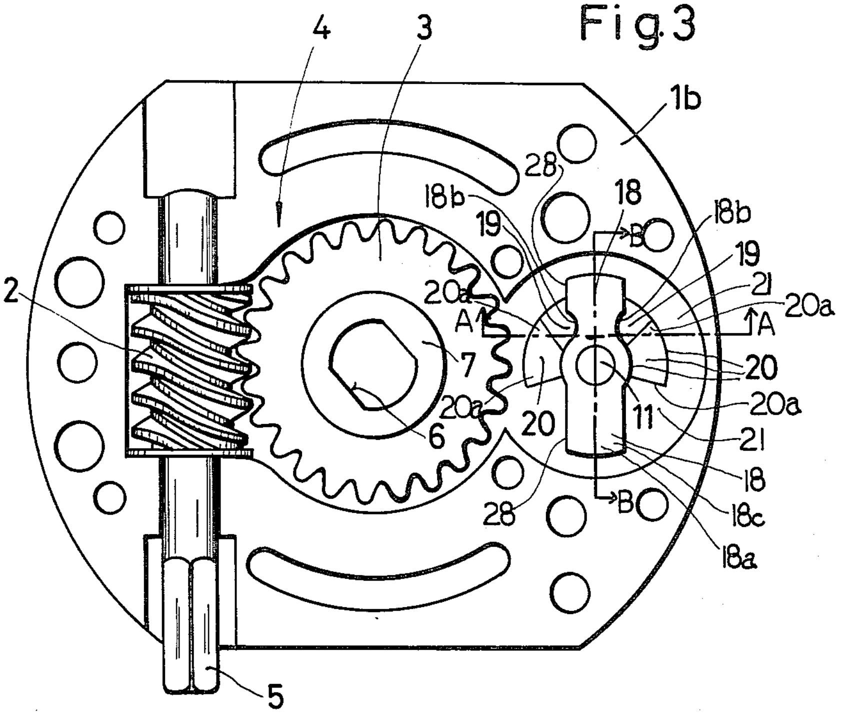
FIG. 3 is a plan view of the same housing, after removal of an abutment pinion and a locking disc, for illustration of the abutment.
Figure 3B:
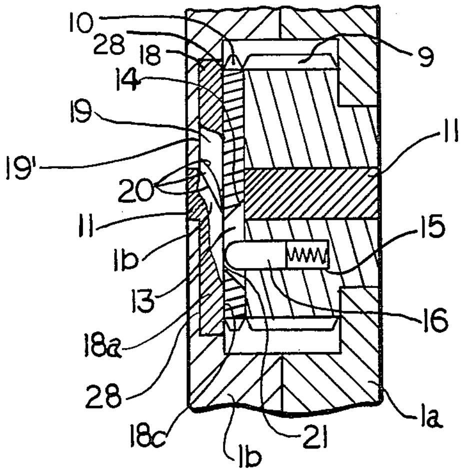
FIGS. 3A and 3B are sections taken along the lines A—A and B—B, respectively, of FIG. 3, however with portions of the abutment and axle broken away in FIG. 3B in order to see the inclined surface and recess of the housing half.
Figure 3A:
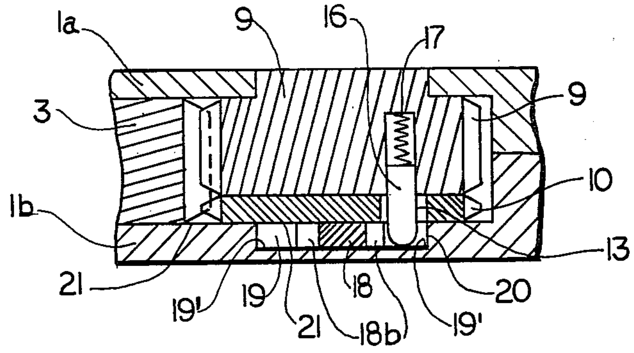

In the housing half 1*b*, an abutment 18 is secured integrally or formed in one-piece with the axle 11. The axle 11 is mounted fixedly, non-rotatably relative to the housing half 1*b* in a recess 28 in the housing half 1*b*. Recesses 19 are formed in the housing half 1*b* on both semi-circularly shaped lateral sides 18*b* of the abutment 18. The recesses 19 do not penetrate completely through the housing half 1*b*, but are defined by a remaining lowermost surface 19' of the housing half 1*b*. The end of the abutment pin 16 can engage against these surfaces 19'. The abutment pin 16 can slide into the recess 19 (FIG. 3A) over inclined or sloping surfaces 20 until the abutment pin 16 abuts or engages the abutment 18 on one or the other lateral side 18*b* adjacent the recesses 19. By means of the latter, these lateral sides 18*b* of the abutment 18 are exposed to act as lateral abutments for the abutment pin 16 in order to prevent rotation of the pinion 9 when the abutment pin 16 is in a recess 19 and abuts the lateral side 18*b* of the abutment 18. The surface 18*c* of the diametric other end 18*a* of the abutment 18 is substantially flush and coplanar with the inner surface 21 of the housing half 1*b*, whereby the free end of the abutment pin 16 when sliding on the surface 21 during the beginning of a winding up operation (e.g. FIG 3B), can likwise slide over the surface 18*c* of the abutment end 18*a* without being blocked.

The assembling of the previously discribed mechanical gearing or transmission takes place in the manner that the abutment pin 16 abuts or engages the abutment 18 on one side with a closed roller blind or let down or opened awning. The choice of the abutment side for the abutment pin 16 depends on the assembly of the mechanical gearing on the end of the shaft for the roller blind, or the awning, respectively, whereby a movement of the drive shaft 5 in the clockwise sense corresponds to the winding-up direction and a movement of the drive shaft 5 in the counterclockwise sense corresponds to the unwinding direction. By the double-sided formation of the abutment 18, it is possible to leave the selection of the drive side open until the final assembly of the roller blind or the awning.

If the mechanical gearing has been assembled, as previously described in the closed position of the roller blind, or in the let-down position of the awning, during the winding-up of the window shade, roller blind, gate or awning, respectively, the abutment pin 16 slides out of the recess 19 and slides over the adjacent inclined surface 20, and thereafter also slides out of the slot 13 over the inclined surfaces 14 on the locking disc 10 back into the blind hole 15 in the pinion 9 until the pin 16 is held back in the blind hole 15 by that surface of the locking disc 10 which abuts the pinion 9. Consequently, during further winding-up, the abutment pin 16 can pass over the abutment 18 and its lateral sides 18*b*.

Conversely, during the unwinding of the roller blind or the awning, respectively, shortly before reaching the end position, the abutment pin 16 again slides into the recess 19 through the slot 13 in the locking disc 10, until the pin 16 abuts the abutment 18 and one of the lateral abutment sides 18*b*, thereby blocking or locking the mechanical gearing or transmission in the unwinding direction.

In further detail, in operation, assume that the roller blind, gate or awning is in the closed or let down position. Here the abutment pin 16 extends through the slot 13 in the locking disc 10 and into the recess 19 abutting a side 18*b* of the abutment 18. If now the mechanical gearing is cranked to begin winding up, the worm 2 turns the worm wheel 3, which in turn rotates the abutment pinion 9 and the locking disc 10. This causes the abutment pin 16 to slide on the inclined surface 20, the latter being formed on the housing half 1*b*, whereupon the pin 16 axially slides inwardly somewhat in the hole 15 in the pinion 9 up to the surface of the locking disc 10 (cf. FIG. 3B). Upon further rotation of the pinion 9, yet during the beginning of the winding-up operation, but before the abutment pin reaches the other lateral side 18*b* of the abutment 18 adjacent the other recess 19 (the latter lateral side 18*b* being approximately 350° relative the first lateral side 18*b*), the slot 13 is angularly displaced completely beyond the pin 16, such that the pin 16 is pushed sufficiently into the blind hole 15, in order to enable the pin 16 to pass over the lateral sides 18*b* and the abutment 18, without interference. That is, long before the pin 16 reaches the opposite recess 19 at the other lateral side 18*b* of the abutment 18, due to rotation of the abutment pinion 9 by means of the worm wheel 3, the different numbers of teeth between the locking disc 10 and the abutment pinion 9 cause a sufficient angular displacement of the slot 13 relative to the pin 16, such that the abutment pin 16 slides along the inclined end 14 of the slot 13, and the pin 16 is pressed further into the blind hole 15 until its free end is blocked behind the locking disc 10. In this position, the rear surface of the locking disc 10 maintains the pin inwardly inside the hole 15 so that the pinion 9 and the locking disc 10 can continue to turn without the pin 16 engaging the fixed abutment 18 and its abutment surfaces 18*b*. Consequently, during further winding up of the mechanical gearing, the abutment 18 and its surfaces 18*b* do not block further rotation of the mechanical gearing.

Figure 6:
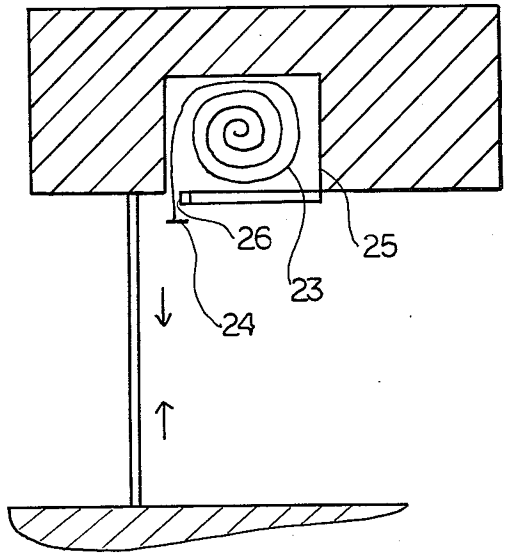
FIG. 6 is a side elevational view showing a roller blind in the drawn-up position in front of a window.

So that the transmission can be used for various lengths and types of roller blinds and awnings, the drawn-up position is secured against further rotation by a small abutment angle member 24 (FIG. 6) mounted on the outside on each side of the bottom of the roller blinds or awnings 23, before it can disappear in a slot 26, which slot is left open in the casing of the box 25 of the roller blinds.

While I have disclosed one embodiment of the invention it is to be understood that this embodiment is given by example only and not in a limiting sense.

I claim:

1. Transmission for roller blinds and awnings with a self-locking worm wheel drive having a worm wheel, comprising a housing formed in two parts, a shaft being mounted in said housing, the worm wheel drive being mounted on an end of said shaft, an abutment means disposed in said housing for limitation of the number of rotations of the shaft in the unwinding direction, said abutment means comprises:

an abutment pinion having a number of teeth, said abutment pinion meshing with said worm wheel;

a locking disc having a different number of teeth than that of said abutment pinion, said locking disc meshing with said worm wheel, said locking disc and said abutment pinion being mounted coaxial to each other in said housing;

an abutment pin axially moveably disposed in said abutment pinion;

an abutment secured to said housing;

spring means for prestressing said abutment pin, said locking disc being formed with a slot displaceably operatively adjacent said abutment pin, said abutment pin operatively engages said abutment in a predetermined position with said pin extending through said slot.

2. The transmission according to claim 1, wherein said housing adjacent said abutment defines inlet and outlet ends, the ends of said slot as well as said inlet and outlet ends are formed with inclined surfaces, said abutment pin slides against said ends, respectively.

3. The transmission according to claim 1, wherein said abutment on both sides thereof, respectively, is operatively abutable by said pin.

4. The transmission according to claim 1, wherein said locking disc has one less tooth than that of said abutment pinion.

5. The transmission according to claim 1, further comprising an axle means for mounting said abutment pinion and said locking disc thereon, said axle means is formed in one-piece with said abutment and is operatively fastened with said abutment in one of said two parts of said housing.

6. The transmission according to claim 5, wherein said locking disc and said abutment pinion are disposed against one another, said abutment is disposed between said housing and against said locking disc, said abutment constitutes a member extending diametrically relative to said axle by a distance from the center of said axle at least equal to the distance from the center of said axle to said abutment pin.

* * * * *